(No Model.)
J. & V. L. NEY.
HAY ELEVATOR.
No. 465,195.                     Patented Dec. 15, 1891.
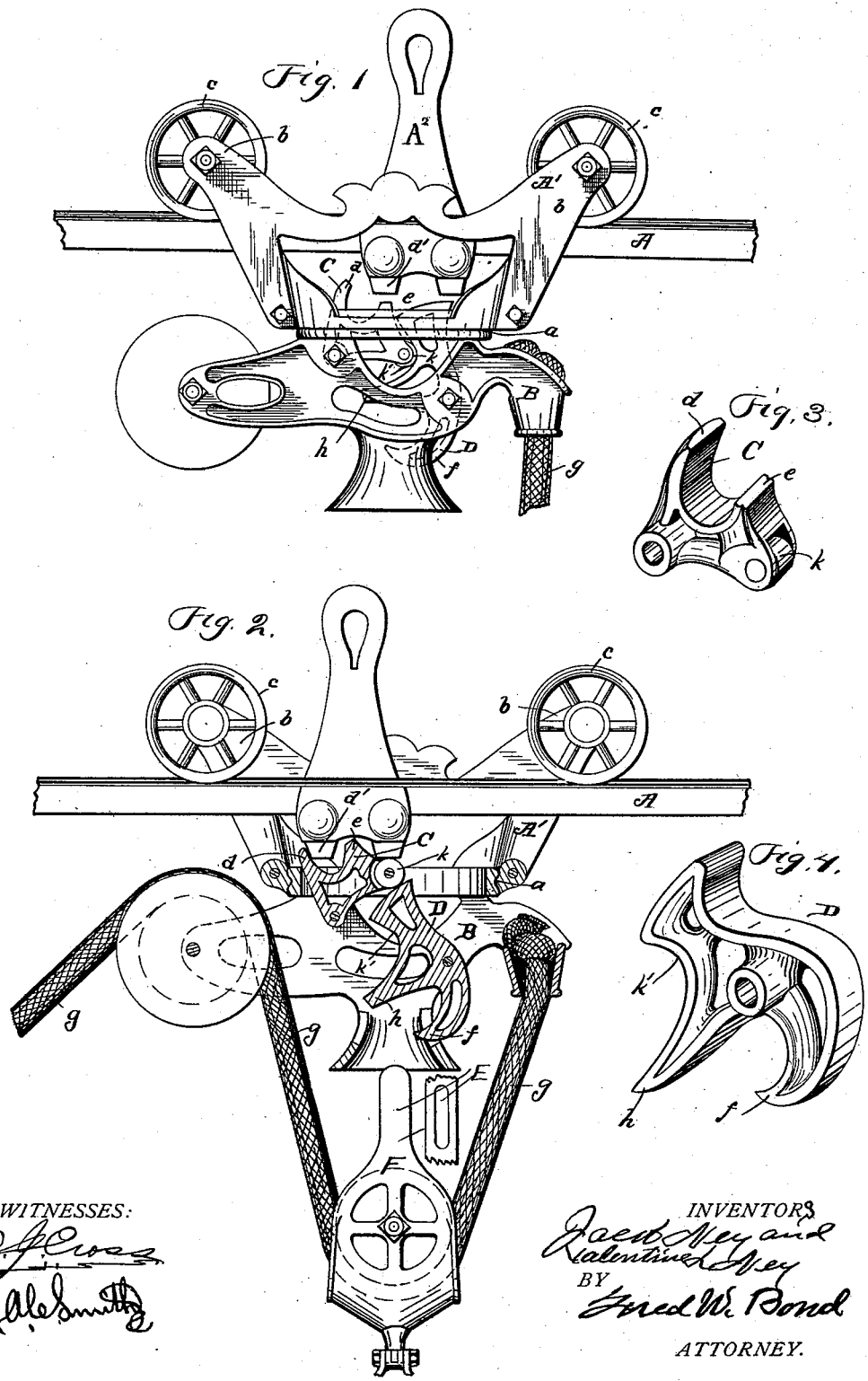
WITNESSES:
INVENTORS
Jacob Ney and
Valentine Ney
BY
Fred W. Bond
ATTORNEY.

UNITED STATES PATENT OFFICE.

JACOB NEY AND VALENTINE L. NEY, OF CANTON, OHIO.

HAY-ELEVATOR.

SPECIFICATION forming part of Letters Patent No. 465,195, dated December 15, 1891.

Application filed July 14, 1891. Serial No. 399,472. (No model.)

*To all whom it may concern:*

Be it known that we, JACOB NEY and VALENTINE L. NEY, citizens of the United States, residing at Canton, in the county of Stark and State of Ohio, have invented certain new and useful Improvements in Hay-Elevators; and we do hereby declare that the following is a full, clear, and exact description of the same, reference being had to the annexed drawings, making a part of this specification, and to the letters of reference marked thereon, in which—

Figure 1 is a side elevation showing the different parts in proper position to lock the elevating-head to the traveling frame and release said traveling frame from the stop-blocks. Fig. 2 is a sectional view showing the frame located upon a track and the parts in position to lock the frame to the stop-block. Fig. 3 is a detached view of the dog designed and calculated to lock the frame to the stop-blocks and hold the elevating-head dog in position to lock the elevating-head to the traveling frame. Fig. 4 is a detached view of the elevating-head dog.

The present invention has relation to hay-elevators; and it consists in the different parts and combination of parts hereinafter described, and particularly pointed out in the claims.

Similar letters of reference indicate corresponding parts in all the figures of the drawings.

In the accompanying drawings, A represents the track, which may be of any desired kind or style, and is supported at the required height by means of suitable hangers fixed to the rafters of a barn or other suitable framework in the ordinary manner. The two frames A' and B are swiveled together by means of the tongue and groove $a$. (Best seen in Fig. 2.) The frame A' is provided with the arms $b$, which arms extend upward, as shown in the drawings, and to the upper ends of the arms $b$ are journaled the traveling wheels $c$, and in use four arms $b$ and four traveling wheels $c$ are used; but it will be understood that a less number may be used without departing from the nature of our invention. To the frame B are pivotally attached the dogs C and D, said dogs being located substantially as shown in the drawings. The dog C is provided with the extension $e$, which extension is for the purpose of locking the traveling frame to the track, as hereinafter described. This dog C is also provided with the extension $d$, which is for the purpose hereinafter described. The dog D is provided with the hooked extension $f$, which hooked extension is for the purpose of engaging the slotted arm E of the elevating-head F.

When a load of hay or other material has been attached to the elevating-head F, the elevating-rope $g$ is operated in the ordinary manner, thereby elevating the elevating-head F, at which time the top or upper end of the slotted arm comes in contact with the under side of the arm $h$ and elevates the free end of said arm, which in turn forces the hooked extension $f$ toward and through the slotted arm E, thereby connecting the elevating-head F and its load to the traveling frame. As the arm $h$ is elevated the top or upper end of the dog D is moved from under the dog C, thereby permitting said dog C to drop, as illustrated in Fig. 1, which in turn locks the dog D and retains the elevating-head F by means of its hooked extension $f$.

For the purpose of preventing the dog C from sticking or lodging against the face of the dog D the anti-friction roller $k$ is provided and is journaled to the dog C, and is located substantially as shown in the drawings. By providing the anti-friction roller $k$ it removes the friction between the meeting faces of the dogs C and D. As the dog C drops the anti-friction roller $k$ is received into the recess $k'$, which securely locks the dog D. When the dog C drops or falls, its extension $e$ is automatically disengaged from the stop-lug $d'$, thereby releasing the traveling carriage from the track, at which time the traveling carriage is free to move upon the track to any desired point, where it is desired to drop or deposit the hay or other material. Upon the return of the traveling carriage to the point where it is desired to release the elevating-head F for another load the extension $d$ comes in contact with the proper stop-lug $d'$, which elevates the free end of the dog C, thereby automatically disengaging the hooked extension $f$ from the slotted arm E and elevating the extension $e$, which in turn locks the traveling carriage to the track A.

The hanger $A^2$ is provided with the stop-lugs $d'$, which stop-lugs are formed integral with said hanger, and are so formed for the purpose of providing a hanger that will stop the carriage at a point directly below said hanger, thereby providing a means for supporting the track at a point where the load is elevated. By providing the combined hanger and stop-lug $A^2$ it can be placed directly above the point where the load is to be elevated, thereby forming a support for the track at a point where the greatest strain comes while the load is being elevated. Heretofore the stop-lugs have been formed separate from the hangers, and hence the track cannot be supported at the point where the stop-lug is located. By this arrangement no separate stop-lugs are required, thereby reducing the cost in the construction of a track and its carriage. It will be understood that by providing the anti-friction roller $k$ the free end of the dog C can be dropped into the recess $k'$ and lock the dog D in a position to hold the elevating-head F by means of the hooked extension $f$ and the slotted arm E.

Having fully described our invention, what we claim as new, and desire to secure by Letters Patent, is—

1. In a hay-elevator having a track or way and a traveling carriage, the combination of the dog C, provided with the extension $e$ and the anti-friction roller $k$, the dog D, provided with the recess $k'$, and the elevating-head F, provided with the slotted arm E, substantially as and for the purpose set forth.

2. The combination of the combined hanger and stop-lug $A^2$, the dog C, provided with the extension $e$ and the anti-friction roller $k$, the dog D, provided with the recess $k'$ and the hooked arm $f$, and the elevating-head F, provided with the slotted arm E, substantially as and for the purpose set forth.

In testimony that we claim the above we have hereunto subscribed our names in the presence of two witnesses.

JACOB NEY.
VALENTINE L. NEY.

Witnesses:
E. A. C. SMITH,
F. W. BOND.